US 9,990,550 B2

United States Patent
Kuehnle et al.

(10) Patent No.: US 9,990,550 B2
(45) Date of Patent: *Jun. 5, 2018

(54) WIDE BASELINE OBJECT DETECTION STEREO SYSTEM

(71) Applicants: Andreas U. Kuehnle, Villa Park, CA (US); Hans M. Molin, Mission Viejo, CA (US); Marton Gyori, Budapest (HU); Adam Szoellosi, Debrecen (HU); Cathy L. Boon, Orange, CA (US)

(72) Inventors: Andreas U. Kuehnle, Villa Park, CA (US); Hans M. Molin, Mission Viejo, CA (US); Marton Gyori, Budapest (HU); Adam Szoellosi, Debrecen (HU); Cathy L. Boon, Orange, CA (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/491,009

(22) Filed: Sep. 19, 2014

(65) Prior Publication Data

US 2016/0086040 A1   Mar. 24, 2016

(51) Int. Cl.
*G06K 9/00* (2006.01)
*B60R 1/00* (2006.01)
*G06T 7/73* (2017.01)

(52) U.S. Cl.
CPC ............ *G06K 9/00805* (2013.01); *B60R 1/00* (2013.01); *G06K 9/00201* (2013.01); *G06T 7/74* (2017.01); *B60R 2300/105* (2013.01); *B60R 2300/107* (2013.01); *B60R 2300/303* (2013.01); *B60R 2300/8093* (2013.01); *G06T 2207/10012* (2013.01); *G06T 2207/30196* (2013.01); *G06T 2207/30261* (2013.01)

(58) Field of Classification Search
CPC ................ B60R 1/00; B60R 2300/105; B60R 2300/107; B60R 2300/303; B60R 2300/8093; G06T 7/74; G06T 2207/10012; G06T 2207/30196; G06T 2207/30261; G06K 9/00201; G06K 9/00805

See application file for complete search history.

(56) References Cited

U.S. PATENT DOCUMENTS 3,069,654 A   12/1962   Hough
6,911,997 B1   6/2005   Okamoto et al.
(Continued)

OTHER PUBLICATIONS

Mittal et al. "M2Tracker: A Multi-View Approach to Segmenting and Tracking People in a Cluttered Scene", 2003, International Journal of Computer Vision, vol. 51, Issue 3, 189-203.*
(Continued)

*Primary Examiner* — Katrina Fujita
(74) *Attorney, Agent, or Firm* — Fay Sharpe LLP (57) ABSTRACT

When detecting an object of interest, such as a bicyclist passing a truck, two downward looking cameras both capture images of the cyclist and detect the cyclist as a deviation from the flat ground plane. The ground plane is reconstructed using a homography (projection) matrix of each camera and compared. Where the camera images do not agree, the ground is not flat. The cyclist is located as the intersection of the rays extending to either end of the area of disagreement between the images.

23 Claims, 8 Drawing Sheets

(56) References Cited

U.S. PATENT DOCUMENTS

| | | | | |
|---|---|---|---|---|
| 7,388,476 | B2* | 6/2008 | Nagaoka | B60K 35/00 340/435 |
| 7,551,067 | B2 | 6/2009 | Otsuka et al. | |
| 8,446,268 | B2 | 5/2013 | Hideshiro | |
| 2002/0196340 | A1* | 12/2002 | Kato | B60R 1/00 348/148 |
| 2005/0196034 | A1* | 9/2005 | Hattori | B60R 1/00 382/154 |
| 2008/0239097 | A1 | 10/2008 | Izuhara et al. | |
| 2011/0282581 | A1 | 11/2011 | Zeng | |
| 2012/0062743 | A1* | 3/2012 | Lynam | B60Q 9/005 348/148 |
| 2012/0269382 | A1 | 10/2012 | Kiyohara et al. | |
| 2013/0027196 | A1 | 1/2013 | Yankun et al. | |
| 2013/0070095 | A1 | 3/2013 | Yankun et al. | |
| 2013/0182114 | A1* | 7/2013 | Zhang | H04N 7/18 348/150 |
| 2013/0314503 | A1 | 11/2013 | Nix et al. | |
| 2014/0347475 | A1* | 11/2014 | Divakaran | G06K 9/00771 348/135 |
| 2015/0178884 | A1* | 6/2015 | Scholl | G06T 3/0018 348/36 |

OTHER PUBLICATIONS

International Search Report and Written Opinion of corresponding International Application No. PCT/US2015/040828, dated Oct. 26, 2015, 13 pages.

Gandhi et al., "Vehicle Mounted Wide FOV Stereo for Traffic and Pedestrian Detection," IEEE International Conference on Image Processing, Piscataway, NJ, USA, Sep. 11, 2005, vol. 2, pp. 121-124.

Wang et al., "Shape-based Pedestrian/Bicyclist Detection via Onboard Stereo Vision," IMACS Multiconference on Computational Engineering in Systems Applications (CESA), Oct. 1, 2006, Beijing, China, pp. 1776-1780.

Lai et al., "Estimation of Moving Vehicle Locations Using Wheel Shape Information in Single 2-D Lateral Vehicle Images by 3-D Computer Vision Techniques," Robotics and Computer-Integrated Manufacturing, Elsevier Science Publishers BV, Barking, GB, vol. 15, No. 2, Apr. 1, 1999, pp. 111-120.

Kelly et al., "Pedestrian Detection and Tracking Using Stereo Vision Techniques," Mar. 1, 2008, retrieved from the internet: http://doras.dcu.ie/109/, pp. 84-87.

Eshel et al., "Tracking in a Dense Crowd Using Multiple Cameras," International Journal on Computer Vision, Kluwer Academic Publishers, BO, vol. 88, No. 1, Nov. 17, 2009, pp. 129-143.

Possegger et al., "Robust Real-Time Tracking of Multiple Objects by Volumetric Mass Densities," IEEE Computer Society Conference on Computer Vision and Pattern Recognition, Proceedings, IEEE Computer Society, US, Jun. 23, 2013, pp. 2395-2402.

Martin et al., "Volumetric Descriptions of Objects from Multiple Views," IEEE Transactions on Pattern Analysis and Machine Intelligence, IEEE Computer Society, USA, vol. PAMI-05, No. 2, Mar. 1, 1983, pp. 150-158.

* cited by examiner

WIDE BASELINE OBJECT DETECTION STEREO SYSTEM

BACKGROUND

The present application finds particular application in surround-view vehicle imaging systems. However, it will be appreciated that the described techniques may also find application in other vehicle monitoring systems, other imaging systems, or other vehicle safety systems.

One conventional approach to detecting objects near a vehicle employs a single downward and rearward facing camera that detects obstacles in the path of the vehicle. A two dimensional landmark, such as road lines, is established with which to compare brightness in each image. A difference in brightness above a certain threshold indicates a three dimensional object is also in the image.

Another approach relates to a method to detect objects using a single downward facing camera. The motion of each pixel is compared over time to determine the presence of obstacles in the field of view of the camera.

The present innovation provides new and improved systems and methods that facilitate comparing images from multiple cameras to identify an object next to a vehicle in order to alert a driver to the presence of the object, which overcome the above-referenced problems and others.

SUMMARY

In accordance with one aspect, a system that facilitates detecting an object of interest, which could be a cyclist, a pedestrian, a post or other three dimensional object in a surround-view image of a vehicle comprises a first camera that captures a first image of an object near the vehicle, and a second camera that captures a second image of the object. The system further comprises a processor configured to generate a composite ground-referenced image by merging the first and second images, analyze the composite image to detect one or more features indicative of the type of object in the composite image, and generate a signal that indicates the presence of the object and location of the object, relative to the vehicle.

In accordance with another aspect, a method of detecting and tracking an object as it passes a vehicle comprise capturing a first image, from a first vantage point, of an object near the vehicle, capturing a second image, from a second vantage point, of the object, and generating a composite image by merging the first and second images. The method further comprises analyzing the composite image to detect one or more features indicative of the type of object in the composite image, and generating a signal that indicates the presence of the object and location of the object relative to the vehicle.

In accordance with another aspect, a processor is configured to execute computer-executable instructions for detecting and tracking an object as it passes a vehicle, the instructions comprising capturing a first image, from a first vantage point, of an object near the vehicle, and capturing a second image, from a second vantage point, of the object. The instructions further comprise generating a composite image by merging the first and second images analyzing the composite image to detect one or more features indicative of the type of object in the composite image, and generating a signal that indicates the presence of the object and location of the object relative to the vehicle.

In accordance with another aspect, an apparatus that facilitates detecting and tracking an object as it passes a vehicle comprises means for capturing a first image, from a first vantage point, of an object near the vehicle, and means for capturing a second image, from a second vantage point, of the object. The apparatus further comprises means for generating a composite image by merging the first and second images, means for analyzing the composite image to detect one or more features indicative of object type in the composite image, and means for generating a signal that indicates the presence of the object and location of the object relative to the vehicle.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate recognizing an object of interest, e.g., a bicyclist, passing a vehicle. In one embodiment, two downward looking fisheye cameras see the cyclist and detect it as a deviation from a flat ground plane. The ground plane is reconstructed using the homography matrix of each camera. When the images are compared, the points at which the images do not agree are determined to be not flat at that point. The cyclist is located as the intersection of the rays extending to either outer or distant end of the area of disagreement D. The image comparison can also be employed to find non flat and potential obstacles in the image.

Figure 1:
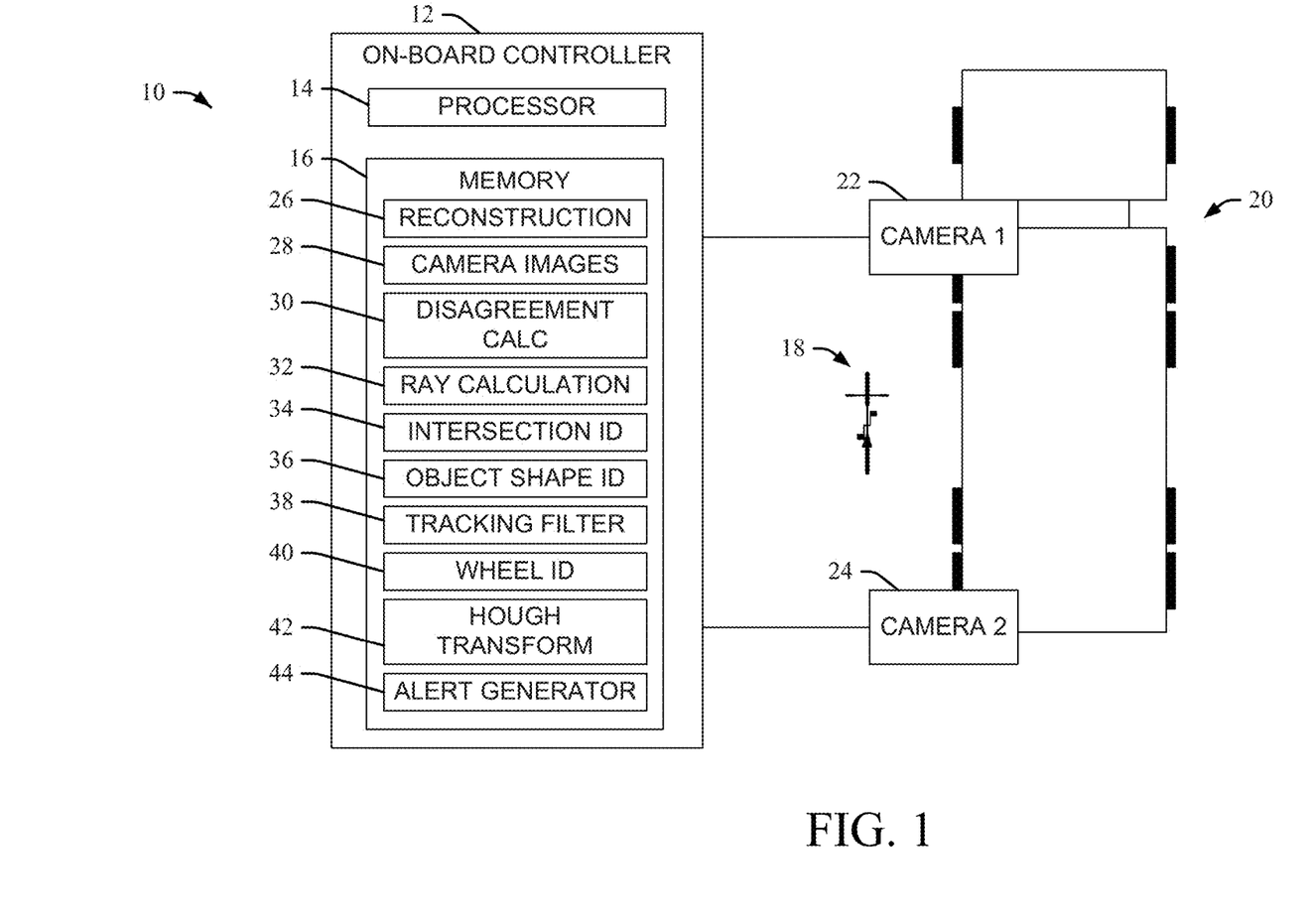
FIG. 1 illustrates a system that facilitates detecting an object proximate to a vehicle and alerting the driver to the presence and location of the object, in accordance with one or more aspects described herein.

FIG. 1 illustrates a system 10 that facilitates detecting a cyclist passing a vehicle and alerting the drive to the presence and location of the cyclist, in accordance with one or more aspects described herein. The system 10 includes an onboard controller 12 comprising a processor 14 that executes, and a memory 16 that stores, computer-executable instructions (e.g., modules, routines, programs, applications, etc.) for performing the various methods, techniques protocols, etc., described herein. In contrast to conventional approaches, the system 10 facilitates detecting a cyclist 18 using multiple camera views and tracking cyclist position relative to the vehicle 20. A first camera 22 is mounted to a first corner of the vehicle, and a second camera 24 is mounted to a second corner of the vehicle in order to provide overlapping fields of view of the side of the vehicle. It will be appreciated that although only two cameras are depicted in FIG. 1 and described for exemplary purposes, more than two cameras can be employed in conjunction with the various embodiments described herein. For instance, cameras can be mounted at each corner of the vehicle, including but not limited to corners of a tractor and/or corners of a trailer on a tractor-trailer combination vehicle.

The memory 16 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

In one embodiment, the processor receives image data from each of the cameras 22, 24, and executes a reconstruction module 26 that reconstructs the image data into camera images 28 that can be stitched together to form a surround-view of the vehicle. In one example, the processor generates a composite image that includes both a front view of the cyclist 18 as captured by the first camera 22, and a rear view of the cyclist 18 as captured by the second camera 24. The front and rear views of the cyclist may be reconstructed to appear as shadow or "ghost" features in the image, such that the views of the cyclist appear transparent to a degree (see, e.g., FIG. 5).

The processor executes a disagreement calculation module 30 that calculates an area of disagreement between the two images used to form the composite image by identifying areas that do not agree in the two images to determine that there is a three dimensional object in the image. That is, images generated by each camera 22, 24 are analyzed and compared to identify an area of disagreement D between the respective images. For instance, the limits of the area of disagreement are identified by the processor, e.g., by pixel differences or the like. The processor executes a ray calculation module 32 that calculates rays or lines emanating from each camera through its field of view. That is, rays are drawn or calculated by the processor to emanate from each camera to the boundaries of the more distant half (relative to each camera) of the area of disagreement D. A ray intersection identification module 34 identifies an intersection R of camera views or rays, wherein the intersection corresponds to a highest point of the cyclist 18 (or other object, such as a pedestrian or the like) as determined by analysis of the area of disagreement D in the images. That is, using knowledge of the camera locations and the area of disagreement, the highest point on the cyclist 18 is determined and tracked.

The calculated rays outline a "shadow" of the pedestrian or cyclist, seen from each camera's vantage point. The calculated rays intersect over the pedestrian or cyclist's head. In one example, the processor scans the pixels defining the area of disagreement and calculates where the rays intersect. The highest point of intersection is identified by the processor as an approximation to the pedestrian or cyclist's head location. Each camera's view is re-projected onto the ground plane, which is assumed to be flat. When a cyclist 18 interrupts the respective camera's view of the ground plane, the ground plane projections disagree and the cyclist is detected.

In another embodiment, the processor executes an object shape identification module 36 that identifies a shape formed by the front view and the rear view representations of the object in the composite image. For instance, an object such as a pedestrian or bicycle approaching from behind the vehicle toward the front of the vehicle, e.g., at an intersection, can be detected. The cameras 22, 24 are calibrated such that the ground plane views generated by the cameras match. That is, an object entirely in the ground plane is seen as being the same by both cameras. Where two camera views disagree and do not generate the same, overlapping, ground plane view as determined by the disagreement calculation module, the pedestrian or cyclist is detected. The location at which the lines intersect is determined to be where the pedestrian or cyclist's feet are located, and when viewed in 3D, the height at which the lines intersect is taken as an approximation of the location of the pedestrian or cyclist's head over the ground. This location (i.e., the pedestrian or cyclist's head) is then tracked. An approximately constant height over the ground is assumed, and may become higher in the case of a cyclist as the cyclist comes to a stop. A tracking filter 38 (e.g., Kalman or alpha-beta) with gating and an additional condition or constraint (e.g., the cyclist does not move backwards to any large degree) is employed when tracking a cyclist's head. Persistent and consistently moving detections at a plausible or predefined height constitute a cyclist detection and are indicated to the driver of the vehicle in a surround view image on a display or user interface (not shown) (e.g., by a red bar extending forward from the back of the truck, up to the cyclist's location, to signify a danger zone for the driver).

In another embodiment, cyclists are recognized by their bicycles, which are in turn recognized by a wheel identification module 40 that detects the wheels and nearby linear structures. Since other, non-bicycle, vehicles also have wheels, a spacing constraint is imposed by the wheel identification module because bicycle wheels are spaced more closely to each other than car or truck wheels. Bicycle wheels also come in a limited range of sizes, again allowing the wheel identification module to distinguish large truck wheels from smaller bicycle wheels. In one embodiment, the wheel identification module performs ellipse detection in combination with wheel tracking to focus on areas where wheels are expected to be positioned once tracking is initiated. Trackable linear structures are searched for and identified near the wheels. A pair of persistently detectable ellipses with plausible spacing between them and linear structures nearby is identified as a bicycle.

According to another embodiment, a V-shape formed in the composite image by the front and rear views of the cyclist is detected and used to confirm that the object is a cyclist (or a pedestrian). For instance, a front view image of a cyclist generated by the first camera 22 and a rear view image of the cyclist generated by the second camera 24 are merged. Ellipses corresponding to the bicycle wheels are identified by the wheel identification module. The bicycle wheels have a limited range of sizes, come in pairs, and move together. In one embodiment, a Hough transform module 42 (e.g., a voting based scheme for which lines/circles/ellipses/general shapes best match an image) or the like is executed by the processor to find ellipses. The ellipses overlap and are substantially of the correct size to facilitate confirmation of the ellipses as corresponding to a set of bicycle wheels. The constellations of ellipses are thus detected and tracked over time. Once a cyclist (or pedestrian) is detected, an alert generator 44 generates an alert signal that is received by the processor, which in turn generates a visual alert on the surround-view image to draw the driver's attention to the cyclist (or pedestrian).

Figure 2:
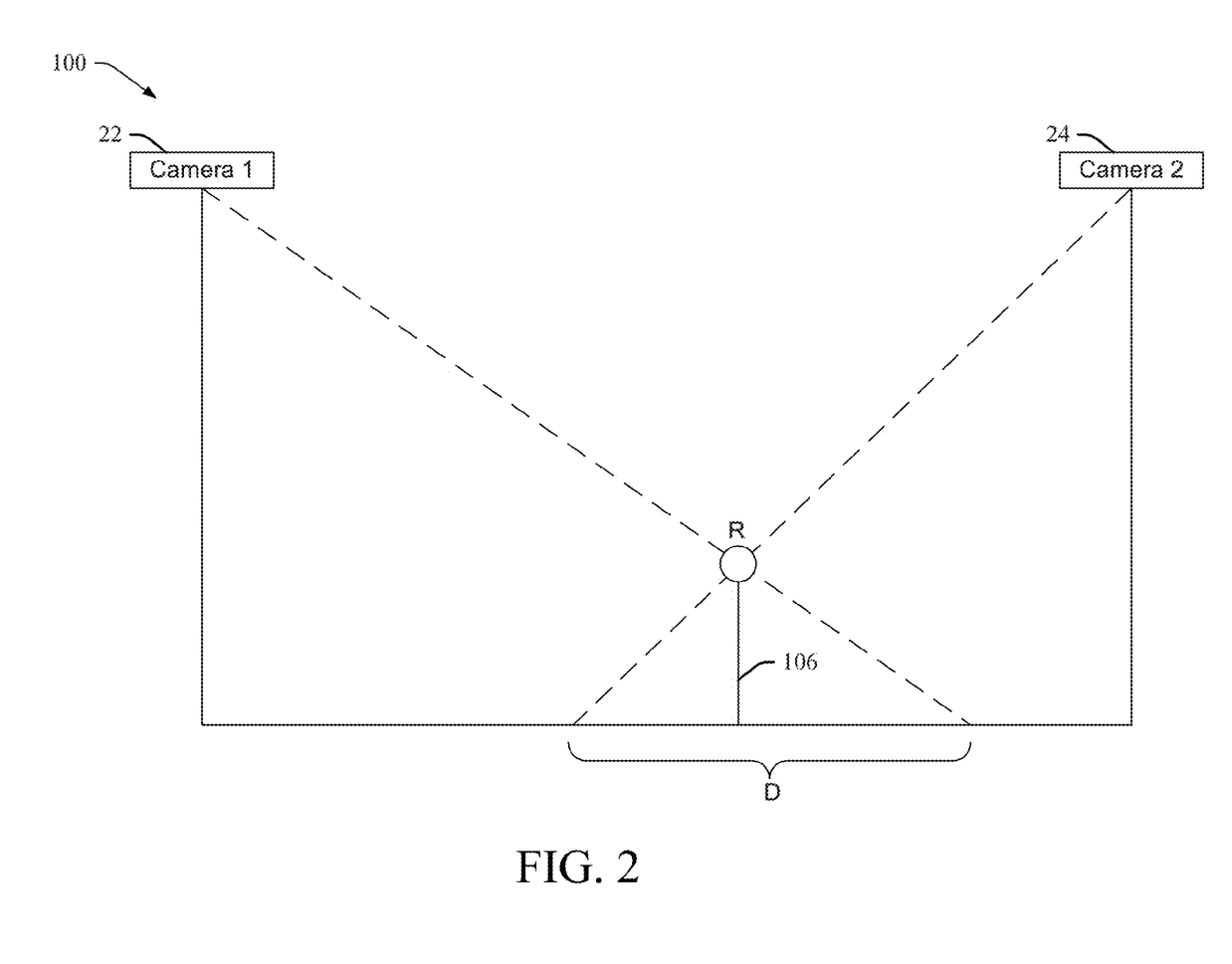
FIG. 2 illustrates a diagram wherein the first camera and second camera image an object (e.g., a cyclist).

FIG. 2 illustrates a diagram 100 wherein the first camera 22 and second camera 24 image an object 106 (e.g., a cyclist). Images generated by each camera are analyzed and compared to identify an area of disagreement D between the respective images, and an intersection of camera views R that denotes a highest point of the object 106 as determined by analysis of the area of disagreement D in the images. That is, using knowledge of the camera locations and the area of disagreement, the highest point on the object is determined and tracked. Each camera's view is re-projected onto the ground plane, which is assumed to be flat. When an object 106 interrupts the respective camera's view of the ground plane, the ground plane projections disagree and the object is detected.

Figure 3:
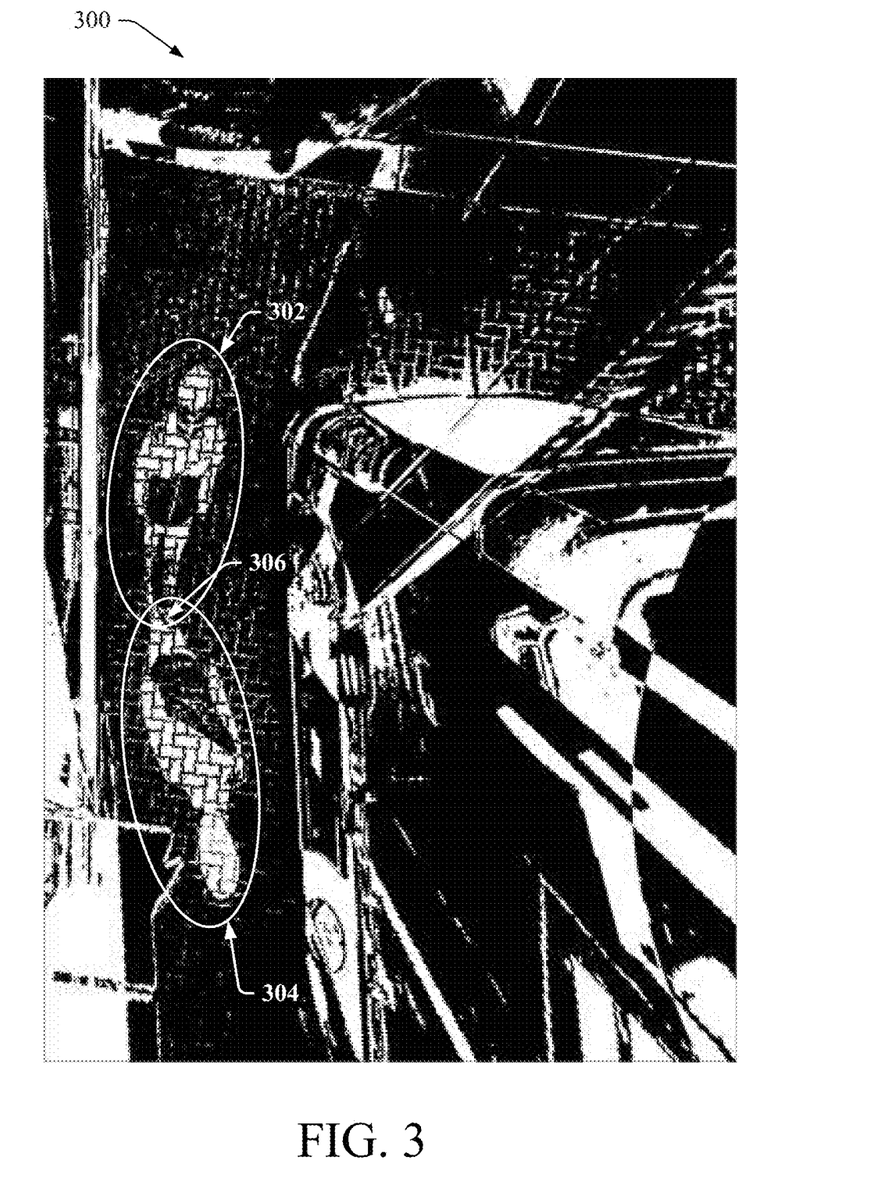
FIG. 3 is an image of a passing object (a pedestrian in this example) as seen by two cameras, wherein images generated by the two cameras are overlapped, in accordance with one or more aspects described herein.

FIG. 3 is an image 300 of a passing object (a pedestrian in this example) as seen by two cameras, wherein images generated by the two cameras are overlapped, in accordance with one or more aspects described herein. An object such as a pedestrian or bicycle approaching from behind the vehicle to the front of the vehicle, e.g., at an intersection, can be detected. The detection is performed using stereo cameras viewing the detection zone and by dynamic modeling of the bicycle location. For instance, a pair of stereo cameras that view the area of interest to the vehicle are provided, such as are described with regard to FIG. 1. The cameras are calibrated such that the ground plane views generated by the cameras match. That is, an object entirely in the ground plane is seen as being the same by both cameras (e.g., there is no image difference between the two cameras).

A pedestrian or cyclist, being over the ground plane, do not result in a matched view. To illustrate this example, the pedestrian in FIG. 3 is seen both from a front view 302 and a rear view 304, and only at the feet 306 are the two views shared. The two camera views disagree and do not generate the same, overlapping, ground plane view where the pedestrian or cyclist is visible. Just over the pedestrian or cyclist's head, where the flat ground plane background is again seen by the cameras, the views agree again. The limits of the area of disagreement are identified by the processor, and rays can be drawn or calculated by the processor to emanate from each camera to the boundaries of the more distant half (relative to each camera) of the area of disagreement. These rays outline a "shadow" of the pedestrian or cyclist, seen from each camera's vantage point. The calculated rays intersect over the pedestrian or cyclist's head. The processor scans the pixels defining the area of disagreement and calculates where the rays intersect. The highest point of intersection is identified by the processor as an approximation to the pedestrian or cyclist's head location.

Figure 4:
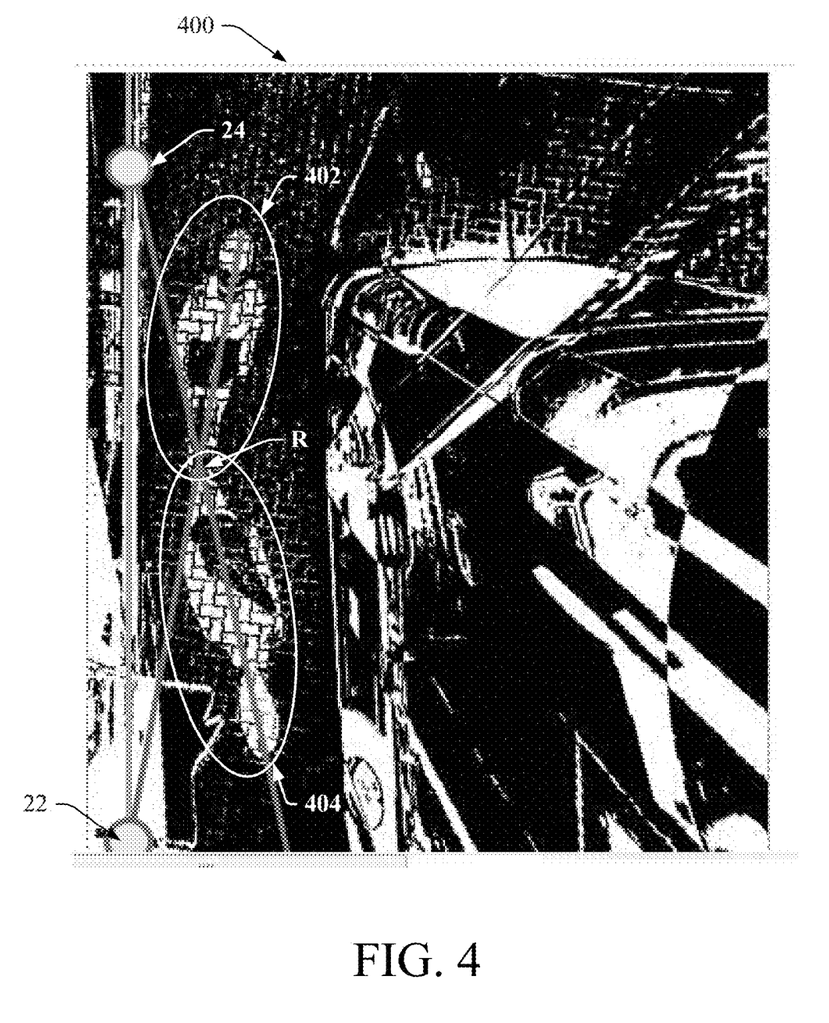
FIG. 4 shows an example of a merged image in which an intersection of rays R has been identified.

FIG. 4 shows an example of a merged image 400 in which an intersection of rays R has been identified. Two cameras 22, 24 are positioned at or near the corners of the vehicle, and capture respective front and rear views 402, 404 of the object, which collectively define an area of disagreement between the two camera images. A line or ray is drawn from each camera to the furthest point of the cyclist's or pedestrian's shadow (the head in this example). That is, a ray emanating from each camera is defined and extends to a more distant half of the area of disagreement. In FIG. 4, the more distant half of the area of disagreement relative to the camera 22 is the front view shadow image 402 of the pedestrian. Similarly, the ray emanating from camera 24 extends to the furthest point in the more distant half of the area of disagreement relative to camera 24, which is the is the rear view shadow image 404 of the pedestrian. In one example, where the lines intersect R is where the pedestrian's feet are located, and seen in 3D, the height at which the lines intersect is where the pedestrian's head is positioned over the ground. This location (i.e., the pedestrian's head) is then tracked. An approximately constant height over the ground is assumed, and may become a bit higher in the case of a cyclist as the cyclist comes to a stop. A tracking filter (e.g., Kalman or alpha-beta) with gating and an additional condition or constraint (e.g., the cyclist does not move backwards to any large degree) is employed when tracking a cyclist's head. Sufficiently persistent and consistently moving detections at a plausible height constitute a cyclist detection and are indicated to the driver of the vehicle (for instance, by a red bar extending forward from the back of the truck, up to the cyclist's location, can signify a danger zone for the driver).

Cyclists can also be recognized by their bicycles, which are in turn recognized by their wheels and nearby linear structures. Since other, non-bicycle, vehicles also have wheels, a spacing constraint is imposed on the wheels because bicycle wheels are spaced more closely to each other than car or truck wheels. Bicycle wheels also come in a limited range of sizes, again allowing one to distinguish large truck wheels from smaller bicycle wheels.

The truck cameras 22, 24 are mounted relatively close to the truck body, i.e., closer than a cyclist typically approaches a truck. For this reason, the wheels are seen by the cameras from the side as ellipses. Ellipse detection methods may use random sampling to increase calculation speed. Ellipse detection is combined with wheel tracking to focus on those areas (and sample more densely) where wheels are expected to be positioned once tracking is initiated. For instance, bicycle wheels have a limited range of sizes, come in pairs, and move together. In one embodiment, a Hough transform (e.g., a voting based scheme for which lines/circles/ellipses/general shapes best match an image) or the like can be used to find ellipses. The ellipses overlap and are substantially of the correct size to facilitate confirmation of the ellipses as corresponding to a set of bicycle wheels. Constellations of ellipses can be detected and tracked over time. This aspect improves tracking accuracy.

Bicycles also have a frame connecting the wheels. Therefore, trackable linear structures are searched for and identified near the wheels. For instance, straight lines are detected e.g., using a Hough transform, and analyzed or compared to known patterns. For instance, straight lines corresponding to a bicycle frame or cyclist torso, arms, etc., can be detected and tracked. A pair of sufficiently persistently detectable ellipses with plausible spacing between them and linear structures nearby is identified as a bicycle.

Figure 5:
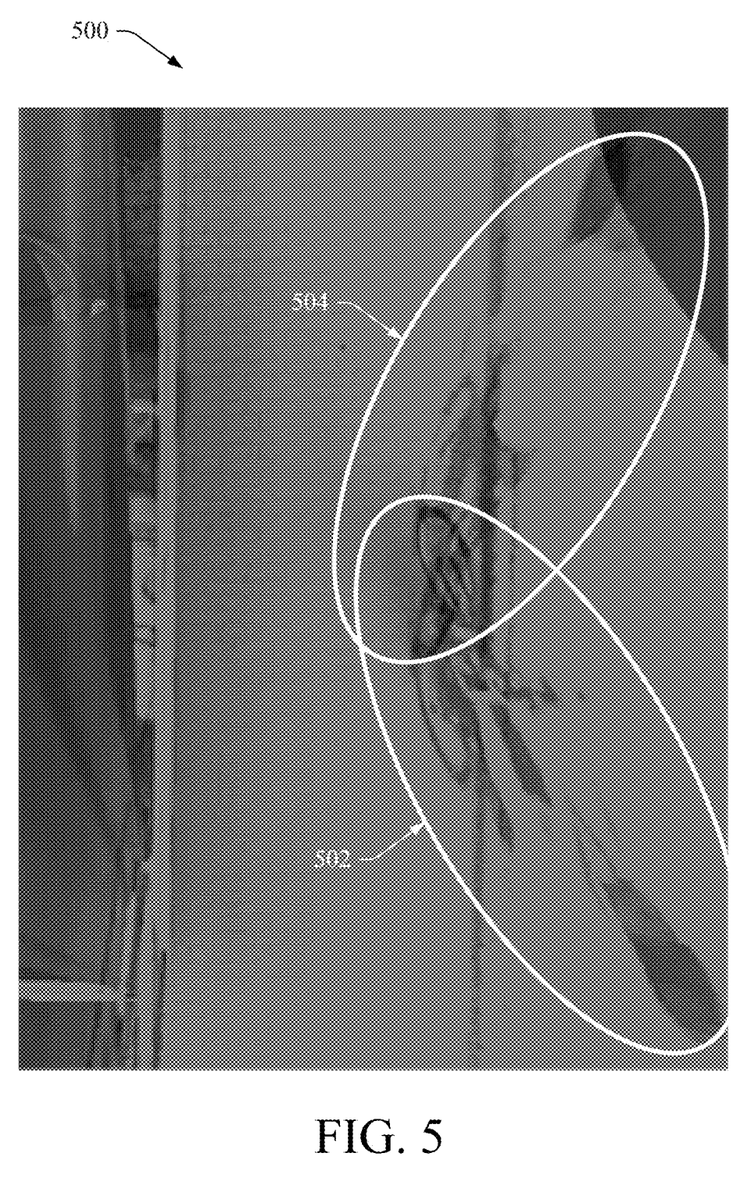
FIG. 5 shows an example of an image in which a front view of a cyclist, generated by a first camera, and a rear view of the cyclist, generated by a second camera, are merged.

FIG. 5 shows an example of an image 500 in which a front view 502 of a cyclist, generated by a first camera, and a rear view 504 of the cyclist, generated by a second camera, are merged. The wheels of the bicycle are overlapped in the composite image, and can be used to facilitate identifying the object as a bicycle. In another embodiment, an outward-facing from the vehicle) V-shape formed by the front and rear views of the cyclist is detected and used to confirm that the object is a cyclist (or a pedestrian.

Figure 6:
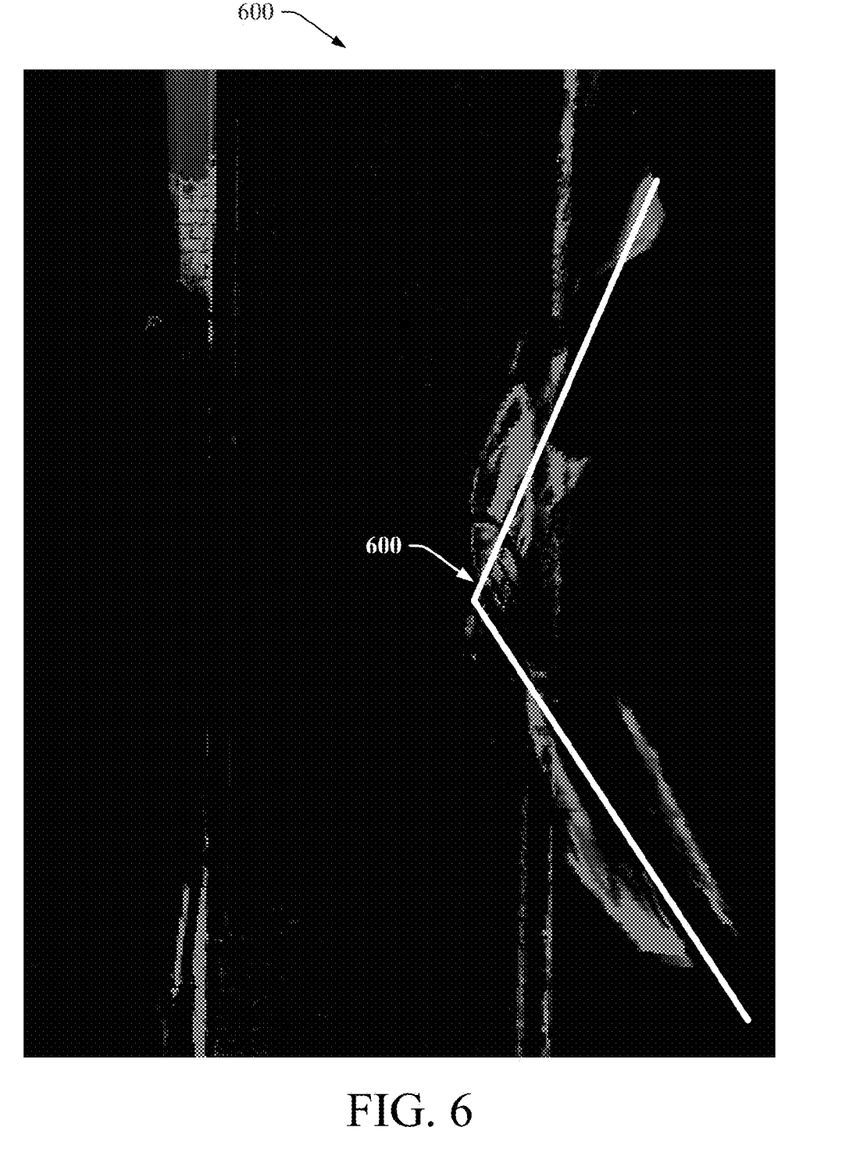
FIG. 6 shows a difference image that has been brightness-compensated and enlarged.

FIG. 6 shows a difference image 600 that has been brightness-compensated and enlarged. A "V" shaped object comprising both the rear view and the front view of the cyclist is identified by two lines forming the V-shape 602. In one embodiment, this V-shape, when detected, is identified as a cyclist (or pedestrian).

Figure 7:
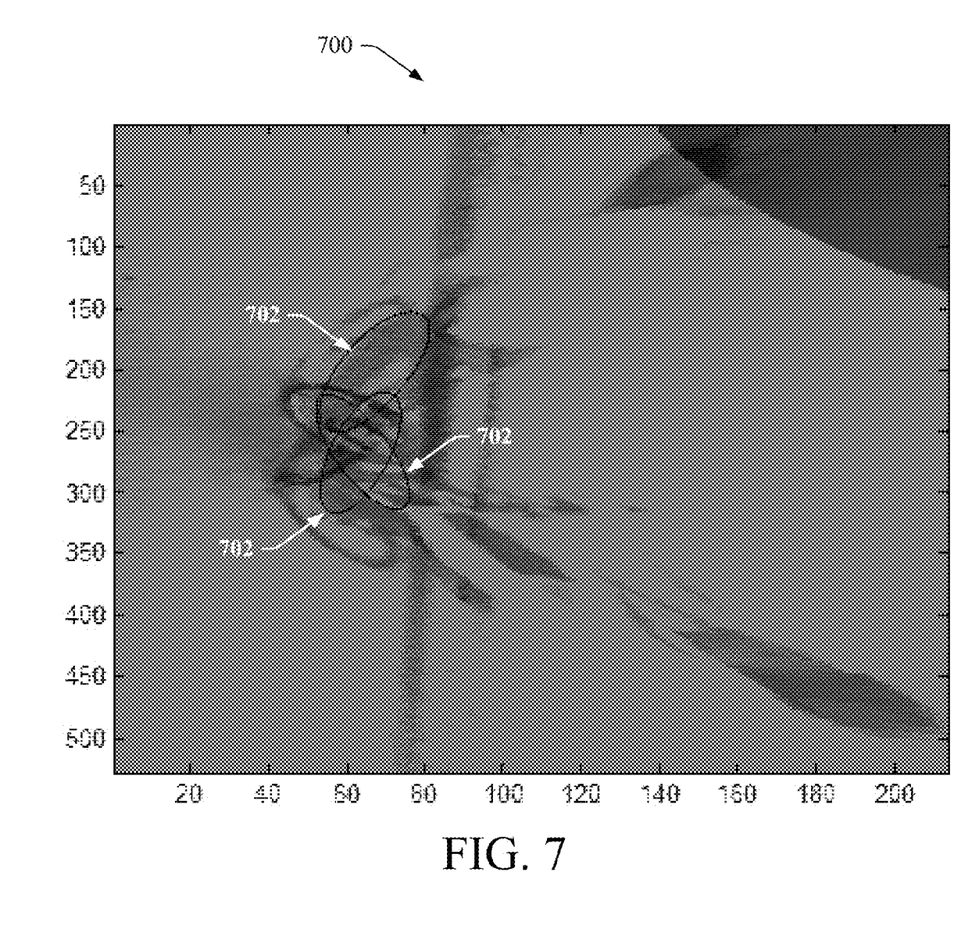
FIG. 7 illustrates an example of a composite image in which a front view of a cyclist generated by a first camera, and a rear view of the cyclist generated by a second camera, are merged, and in which ellipses corresponding to the bicycle wheels are identified.

FIG. 7 illustrates an example of a composite image 700 in which a front view of a cyclist generated by a first camera, and a rear view of the cyclist generated by a second camera, are merged, and in which ellipses 702 corresponding to the bicycle wheels are identified. The bicycle wheels have a limited range of sizes, come in pairs, and move together. In one embodiment, a Hough transform (e.g., a voting based scheme for which lines/circles/ellipses/general shapes best match an image) or the like can be used to find ellipses. The ellipses overlap and are substantially of the correct size to facilitate confirmation of the ellipses as corresponding to a set of bicycle wheels. Such constellations of ellipses can be detected and tracked over time.

In another embodiment, straight lines are detected e.g., using a Hough transform, and analyzed or compared to known patterns. For instance, straight lines corresponding to a bicycle frame or cyclist torso, arms, etc., can be detected and tracked.

Figure 8:
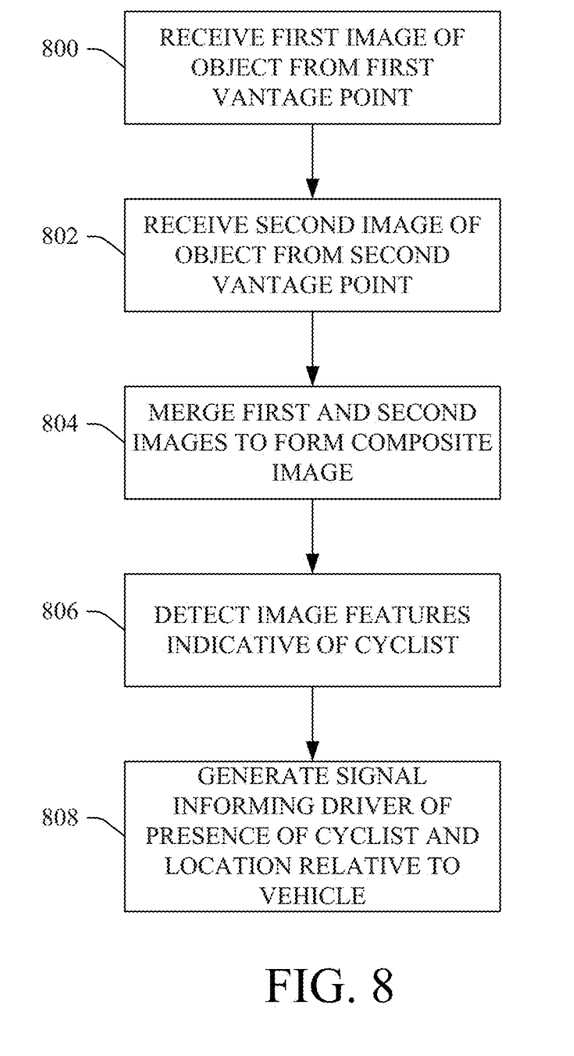
FIG. 8 illustrates a method for detecting and tracking a cyclist as it passes a vehicle, in accordance with one or more aspects described herein.

FIG. 8 illustrates a method for detecting and tracking a cyclist as it passes a vehicle, in accordance with one or more aspects described herein. At 800, a first image is captured from a first vantage point of an object near the vehicle. At 802, a second image from a second vantage point of the object is captured. At 804, a composite image is generated by merging the first and second images. At 806, the composite image is analyzed to detect one or more features indicative of a cyclist in the composite image. At 808, an alert that indicates the presence of the cyclist and location of the cyclist relative to the vehicle is generated and output to a driver of the vehicle.

According to one embodiment, the composite image is analyzed to identify an area of disagreement D between the first and second images. One or more rays emanating from each camera through its field of view are calculated to a boundary of a more distant half, relative to each camera, of the area of disagreement D. An intersection R of camera rays is determined, wherein the intersection corresponds to a highest point of the cyclist, and tracking the highest point of the cyclist as it moves past the vehicle.

In another embodiment, a shape (e.g., a V-shape or the like) formed by a front view representation and a rear view representation of the object is identified in the composite image, wherein the cyclist is determined to be positioned where the front and rear view representations intersect in the composite image. The height of the head of the cyclist above the ground can be determined in the composite image, and the location of the head of the cyclist is tracked as it moves past the vehicle.

In yet another embodiment, one or more ellipses corresponding to the wheels of the bicycle are detected in each of a front view and a rear view of the cyclist in the composite image. For instance, a Hough transform can be employed to detect the ellipses, and the detected ellipses can be compared to predetermined criteria related to ellipse size, spacing, etc., to verify that the ellipses are consistent with a bicycle wheel configuration. The detected ellipses re then tracked across multiple image frames captured by the cameras in order to track the cyclist as it moves past the vehicle.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates detecting an object in a surround-view image of a vehicle, comprising:
a first camera that captures a first image of an object;
a second camera that captures a second image of the object;
a processor configured to:
generate a composite image by merging the first and second images;
analyze the composite image to detect one or more features indicative of the type of object in the composite image; and
generate a signal that indicates the presence of the object and location of the object relative to the vehicle; and
a ray calculation module configured to calculate at least one ray emanating from each camera through its field of view to a boundary of a more distant half, relative to each camera, of an area of disagreement D between the first and second images, wherein the calculated rays define an outline of the object;
wherein the processor is further configured to scan pixels defining the area of disagreement in order to determine where the calculated rays intersect, and identify a highest point of intersection as a highest point of the object;
wherein the processor is further configured to identify a V-shape formed in the composite image by the front and rear views of the object, and to confirm that the object is a one of cyclist or a pedestrian.

2. The system according to claim 1, further comprising a disagreement calculation module configured to analyze the composite image to identify the area of disagreement D between the first and second images.

3. The system according to claim 1, further comprising a ray intersection identification module configured to identify an intersection R of camera rays, wherein the intersection corresponds to the highest point of the object, and wherein the processor is configured to execute a tracking module configured to track the highest point of the object.

4. The method according to claim 3, wherein the object is a cyclist and wherein the processor is configured to execute a tracking module configured to track the highest point of the cyclist.

5. The system according to claim 1, wherein the processor is further configured to execute an object shape identification module that identifies a shape formed by each of a front view representation and a rear view representation of the object in the composite image, wherein the object is a cyclist determined to be positioned where the front and rear view representations intersect in the composite image.

6. The system according to claim 5, wherein the processor is further configured to determine a height of the head of the cyclist above the ground in the composite image, and wherein the processor is configured to execute a tracking filter that tracks the location of the head of the cyclist.

7. The system according to claim 1, wherein the processor is further configured to execute a wheel identification module that is configured to detect one of more wheels of a bicycle.

8. The system according to claim 7, wherein the processor is further configured to execute a Hough transform to detect one or more ellipses corresponding to the wheels of the bicycle in each of a front view and a rear view in the composite image.

9. The system according to claim 8, wherein the processor is further configured to track the detected ellipses in order to track the bicycle.

10. The system according to claim 1, further comprising an alert generator that generates an alert signal upon detection of the object, and wherein the processor is further configured to receive the alert signal and generate a visual alert on the surround-view image to draw the driver's attention to the object.

11. A method of detecting and tracking an object, comprising:
capturing a first image, from a first vantage point, of an object;
capturing a second image, from a second vantage point, of the object;
generating a composite image by merging the first and second images;
analyzing the composite image to detect one or more features in the composite image;
generating a signal that indicates the presence of the object and location of the object relative to the vehicle;
calculating at least one ray emanating from each camera through its field of view to a boundary of a more distant half, relative to each camera, of an area of disagreement D between the first and second images, wherein the calculated rays define an outline of the object;
scanning pixels defining the area of disagreement, determining where the calculated rays intersect, and identifying a highest point of intersection as a highest point of the object; and
identifying a V-shape formed in the composite image by the front and rear views of the object, and confirming that the object is a one of cyclist or a pedestrian.

12. The method according to claim 10, further comprising:
analyzing the composite image to identify the area of disagreement D between the first and second images; and
identifying an intersection R of camera rays, wherein the intersection corresponds to a highest point of the object, and tracking the highest point of the object.

13. The method according to claim 10, further comprising identifying a shape formed by each of a front view representation and a rear view representation of the object in the composite image, wherein the object is a cyclist and determined to be positioned where the front and rear view representations intersect in the composite image.

14. The method according to claim 13, further comprising determining a height of the head of the cyclist above the ground in the composite image, and tracking the location of the head of the cyclist.

15. The method according to claim 10, further comprising detecting one or more ellipses corresponding to the wheels of a bicycle in each of a front view and a rear view of the object in the composite image.

16. The method according to claim 15, further comprising tracking the detected ellipses in order to track the bicycle.

17. A processor configured to detect and track an object, wherein the processor comprises:
circuitry configured to:
receive a first image, from a first vantage point, of an object;
receive a second image, from a second vantage point, of the object;
generate a composite image by merging the first and second images;
analyze the composite image to detect one or more features indicative of the type of object in the composite image;
generate a signal that indicates the presence of the object and location of the object relative to the vehicle; and
calculate at least one ray emanating from each camera through its field of view to a boundary of a more distant half, relative to each camera, of an area of disagreement D between the first and second images, wherein the calculated rays define an outline of the object;
wherein the circuitry is further configured to scan pixels defining the area of disagreement, determine where the calculated rays intersect, and identify a highest point of intersection as a highest point of the object; and
identify a V-shape formed in the composite image by the front and rear views of the object, and confirm that the object is a one of cyclist or a pedestrian.

18. The processor according to claim 17, wherein the circuitry is further configured to:
analyze the composite image to identify the area of disagreement D between the first and second images; and
identify an intersection R of camera rays, wherein the intersection corresponds to a highest point of the object, and tracking the highest point of the object.

19. The processor according to claim 17, wherein the circuitry is further configured to identify a shape formed by each of a front view representation and a rear view representation of the object in the composite image, wherein the object is a cyclist determined to be positioned where the front and rear view representations intersect in the composite image.

20. The processor according to claim 19, wherein the circuitry is further configured to determine a height of the head of the cyclist above the ground in the composite image, and tracking the location of the head of the cyclist.

21. The processor according to claim 17, wherein the circuitry is further configured to detect one or more ellipses corresponding to wheels of a bicycle in each of a front view and a rear view of the object in the composite image.

22. The processor according to claim 21, wherein the circuitry is further configured to track the detected ellipses in order to track the bicycle.

23. An apparatus that facilitates detecting and tracking an object as it moves relative to a vehicle, comprising:
means for capturing a first image, from a first vantage point, of an object;
means for capturing a second image, from a second vantage point, of the object;
means for generating a composite image by merging the first and second images;
means for analyzing the composite image to detect one or more features indicative of the type of object in the composite image;

means for generating a signal that indicates the presence of the object and location of the object relative to the vehicle;

means for calculating at least one ray emanating from each camera through its field of view to a boundary of a more distant half, relative to each camera, of an area of disagreement D between the first and second images, wherein the calculated rays define an outline of the object;

means for scanning pixels defining the area of disagreement, determining where the calculated rays intersect, and identifying a highest point of intersection as a highest point of the object; and means for identifying a V-shape formed in the composite image by the front and rear views of the object and confirming that the object is a one of cyclist or a pedestrian.

* * * * *